United States Patent [19]

Cammarn et al.

[11] Patent Number: 5,417,999
[45] Date of Patent: May 23, 1995

[54] PEANUT BUTTER MADE FROM WHITE-SKINNED PEANUTS

[75] Inventors: Stephen R. Cammarn, Norwich, N.Y.; Bradley Warman; John E. Hunter, both of Cincinnati, Ohio

[73] Assignee: The Procter & Gamble Company, Cincinnati, Ohio

[21] Appl. No.: 160,562

[22] Filed: Dec. 1, 1993

[51] Int. Cl.⁶ .................................. A23L 1/38
[52] U.S. Cl. ................................ 426/633; 426/601; 426/604; 426/654; 426/658
[58] Field of Search ............... 426/633, 601, 604, 654, 426/658

[56] References Cited

U.S. PATENT DOCUMENTS 3,619,207 11/1971 Dzurik et al. .................. 426/633

FOREIGN PATENT DOCUMENTS 2823906 12/1978 Germany ........................ 426/633

OTHER PUBLICATIONS

Conkerton, E. J. et al., *Evaluation of White-Testa Peanut Genotypes for Potential Use as Food Supplements*, Peanut Science (1978), 5, pp. 75–77.

Stansbury, M. F. et al., *the Tannin and Related Pigments in the Red Skins (Testa) of Peanut Kernels*, The Journal of the American Oil Chemists' Society, Aug., 1950, pp. 317–321.

*Primary Examiner*—Helen Pratt
*Attorney, Agent, or Firm*—Tara M. Rosnell; Rose Ann Dabek

[57] ABSTRACT

The present invention relates to peanut butters wherein at least about 75% by weight of the peanuts used to prepare the peanut butter are unblanched white-skinned peanuts. Such peanut butters contain at least about 1% by weight of peanut skins. Such peanut butters further have acceptable taste and appearance. They are not bitter or bland and do not have a speckled appearance.

4 Claims, No Drawings

PEANUT BUTTER MADE FROM WHITE-SKINNED PEANUTS

TECHNICAL FIELD

The present invention relates to peanut butters or peanut spreads made from unblanched white-skinned peanuts. Such peanut butters have desirable taste (e.g. are not bitter or bland) and appearance (e.g., not speckled).

BACKGROUND OF THE INVENTION

Conventional peanut butters consist of a mixture of solid nut particles, liquid peanut oil, and other optional ingredients including flavorants (e.g., a sweetener such as sugar, high fructose corn syrup or honey; and salt), an emulsifier and a stabilizer. A peanut paste is generally prepared by roasting and blanching raw peanut kernels, and then grinding them. The grinding operation breaks the cellular structure of the peanut kernels and liberates oil in which the comminuted nut particles are suspended to form a peanut paste having a pasty and spreadable consistency. The flavorants, emulsifier, stabilizer and other optional ingredients are then added to the peanut paste to provide a peanut butter having a desirable taste and consistency.

Blanching the peanuts removes the peanut skins from the kernels. Conventional peanut butters have typically been prepared from red-skinned peanuts. Red-skinned peanuts were believed to provide superior flavor benefits to peanut butters compared to other types of peanuts. When red-skinned peanuts are used to prepare peanut butter, blanching is necessary to eliminate the bitter taste and speckled appearance associated with the presence of peanut skins in peanut butter (See, for example, Stansbury et al., "The Tannin and Related Pigments in the Red Skins (Testa) of Peanut Kernels", JAOCS, pp. 317–321 (August 1950), herein incorporated by reference) which discloses that tannin, which is present in the skins of red-skinned peanuts, has a characteristic bitter taste).

Unfortunately, blanching peanut kernels is somewhat capital intensive and involves significant raw materials losses which adds additional cost to the production of peanut butters prepared from blanched peanuts. Therefore, it would desirable to be able to make a peanut butter from unblanched peanuts which does not exhibit the detrimental effects to flavor and appearance that are associated with the presence of skins.

It has now been discovered that peanut butters made from unblanched white-skin peanuts have desirable flavor and appearance. Such peanut butters are not bitter and do not have a speckled appearance. Moreover, such peanut butters have good flavor compared to red-skinned peanuts (e.g., they are not bland) and are higher in fiber and lower in calories than peanuts made from red-skinned peanuts.

Conkerton et al. discloses that an acceptable bland-flavored, cream-colored flour can be prepared from unblanched white-skinned peanuts. (See Conkerton et al., "Evaluation of White-Testa Peanut Genotypes for Potential Use as Food Supplements," Peanut Science 5, pp. 75–77 (1978), herein incorporated by reference.) However, the article suggests that peanut butters made from unblanched white-skin peanuts would be undesirably bland. It is surprising, then, that peanut butters having desirable flavor can now be prepared from unblanched white-skin peanuts.

All parts, percentages and ratios used herein are by weight unless otherwise indicated.

SUMMARY OF THE INVENTION

The present invention relates to peanut butters or peanut spreads wherein at least about 75% by weight of peanuts used to prepare the peanut butter are unblanched white-skinned peanuts. Such peanut butters comprise at least about 1% by weight of peanut skins. Such peanut butters further have acceptable taste and appearance. They are not bitter or bland and do not have a speckled appearance.

DETAILED DESCRIPTION OF THE INVENTION

The present invention relates to peanut butters or peanut spreads made from unblanched white-skinned peanuts. Such peanut butters or spreads do not have undesirable flavor or appearance attributes associated with the presence of skins in peanut butters prepared from red-skinned peanuts. Indeed, such peanut butters or spreads are not bitter or bland and do not have a speckled appearance. Since the skins do not have to be removed by blanching, the present invention reduces processing and raw materials costs. Such peanut butters are also typically higher in fiber and lower in calories than peanut butters prepared from red-skinned peanuts.

The peanut paste used to prepare the peanut butters or spreads of the present invention can be formed by any of a number of known methods. For example, the peanuts can be roasted and then ground in a conventional grinder or mill such as a Bauer mill to produce a nut paste of pumpable consistency. It is preferred that the processing stream be maintained in an inert atmosphere, e.g., a nitrogen atmosphere, starting just before the grinding step and continuing through the remainder of the process of preparing the peanut butter. The peanut paste may optionally be defatted or the particle size of the peanut paste may be reduced. See, for example, Wong et al.; U.S. Pat. No. 5,097,027; Issued Jan. 7, 1992, herein incorporated by reference. The peanut paste typically comprises from about 30% to about 60% liquid peanut oil and about 40% to about 70% peanut particles, and more preferably about 35% to about 55% liquid peanut oil and about 45% to about 65% peanut particles.

Regardless of the way in which the peanut paste is prepared, at least about 75% of the peanuts used to prepared the peanut paste used in the peanut butters described herein must comprise unblanched white-skinned peanuts. Preferably, at least about 90%, and more preferably at least 95%, of the peanuts used to prepare the peanut paste used in the peanut butters described herein must comprise unblanched white skinned peanuts. Peanut butters containing these levels of unblanched white-skinned peanuts will comprise at least about 1%, preferably at least about 1.5%, more preferably at least about 2% by weight of peanut skins.

White skinned-peanuts suitable for use in the present invention include Virginia-type peanuts, Runner-type peanuts, Spanish-type peanuts, and Valencia-type peanuts, as well as those disclosed in the Conkerton et al., "Evaluation of White-Testa Peanut Genotypes for Potential Use as Food Supplements", Peanut Science 5, pp. 75–77 (1978) herein incorporated by reference.

Once the peanut paste has been formed, the flavorants, emulsifier, stabilizer and other optional ingredients are added to the peanut paste and mixed to form a homogeneous mixture. The homogenous mixture with its stabilizer components in molten state is typically subjected to processing to properly crystallize the stabilizer. Ordinarily, the stabilizer is in molten state when the homogenous mixture is at a temperature greater than 100° F. (38° C.). The crystallization is carried out by cooling the homogenous mixture from this temperature, for example, in a scraped wall heat exchanger and then optionally subjecting the mixture to agitation, for example, in a picker. After being processed through the picker the product is ordinarily introduced into containers by a filler, then tempered.

In addition to peanut paste, the peanut butters or spreads of the present invention preferably comprise from about 1% to about 5% by weight of a stabilizer. The stabilizer can be any of the known peanut butter stabilizers, for example, hydrogenated rapeseed oil, or other hydrogenated triglycerides having a high proportion of $C_{20}$ and $C_{22}$ fatty acids. (See for example, U.S. Pat. Nos. 3,597,230 and 3,192,102) Stabilizers are usually triglycerides which are solid at room temperature. They solidify in the peanut butter in specific crystalline states and keep the oil from separating. These materials can be mixed with a second hydrogenated oil having an iodine value of less than 8, for example hydrogenated palm oil, canola oil, soybean oil, cottonseed oil, coconut oil, and similar materials. This stabilizer can also be mixed with lower melting fat fractions as, for example, the peanut butter stabilizer composition disclosed in U.S. Pat. No. 4,341,814 (1982).

In addition to the stabilizer, or in lieu thereof, the peanut butters of the present invention can contain an emulsifier. The emulsifier can be any food compatible emulsifier such as mono- and di-glycerides, lecithin, sucrose monoesters, polyglycerol esters, sorbitan esters, polyethoxylated glycerols and mixtures thereof. Up to about 3% and preferably from 1% to 3% stabilizer or emulsifier is used.

The peanut butters or spreads described herein can also optionally contain flavorants. "Flavorants," as the term is used herein, are agents which contribute to or enhance the flavor of the nut butter. These include sweeteners, flavor enhancers, artificial sweeteners, natural and artificial flavors, flavored or candied bits, nut chunks and other additives which contribute to the flavor of the spread. Sweeteners are selected from the group consisting of sugars, sugar mixtures, artificial sweeteners and other naturally sweet materials. Sugars include, for example, sucrose, fructose, dextrose, honey, molasses, high fructose corn syrup, lactose, maltose and maltose syrups. Preferably, the sweetener will be something which has a sweetness intensity about that of sucrose or fructose. Sweeteners are generally added at a level of 0% to about 8%; preferably from about 1% to about 6%.

Artificial sweeteners such as aspartame, acesulfam, saccharine, cyclamate, and glycyrrhizin can also be used in the peanut butters of the present invention. The amount of artificial sweetener used would be that effective to produce the sweetness that is desired; and would be about the equivalent of the addition of from about 1% to 7% of sucrose.

Flavor enhancers including salt or salt substitutes such as potassium chloride, sodium chloride, sodium chloride/potassium chloride mixtures, and seasoned salts can also be used.

The level of flavor enhancer used is a matter of the desired taste level, but usually is from about 0.1% to about 2%. Other flavorants include natural or artificial peanut flavors, roasted flavors, and praline/caramel flavors, walnut flavors, almond flavors and flavor compositions.

The peanut butters of the present invention can also contain nut chunks, and other flavored additives. These additives include chocolate chips or bits or other flavored bits, e.g. butterscotch and peanuts, jellies, (either low calorie jellies or regular jelly or preserves), and praline nuts or other can dies. These additives are usually added at a level of from about 1% to about 20% by weight.

The peanut butters or spreads of the present invention may also optionally contain other ingredients. For example, low calorie oils and zero calorie oils such as sucrose polyesters of long chain fatty acids (olestra) and other polyol polyesters of fatty acids can be used (see for example U.S. Pat. Nos. 3,600,186 to Mattson et al. and 4,005,196 to Jandacek). Mixed triglycerides made from medium and long chain saturated and/or unsaturated fatty acids can also be used herein. An oil which contains at least 10% medium chain triglycerides can also be used. Medium chain triglycerides contain saturated fatty acids having from 6 to 12 carbon atoms. Reduced calorie peanut butters containing medium chain triglycerides are described in U.S. Pat. No. 4,863,753 (Hunter et al., 1989).

EXAMPLES

The following examples are intended only to further illustrate the invention and are not intended to limit the scope of the invention which is defined by the claims.

Example I

A peanut butter according to the present invention is prepared as follows.

| Ingredient | Weight % |
| --- | --- |
| Peanuts* | 90.0 |
| Sugar (12x) | 5.0–6.0 |
| Salt | 1.0–1.5 |
| Molasses | 0.1–1.0 |
| Soybean and rapeseed hardstock | 1.0–1.5 |
| Mono- and diglyceride emulsifier | 0.5–1.0 |
| Standard peanut oil | 0.1–0.5 |
| *The peanuts are a representative sample of SunRunner-type white-skinned peanuts obtained from the University of Florida. These peanuts have the characteristics shown below: | |
| Fat Content | 50.4 |
| PV | 0.42% |
| GCFAC: | |
| C18:1 | 53.2% |
| C18:2 | 28.5% |
| C16 | 9.3% |
| C18 | 2.8% |
| C22 | 2.4% |
| Sugar (total) | 4.1% |
| Sucrose | 3.4% |
| H20 | 5.9% |

The unblanched white-skinned peanuts are roasted at 420° F. (216° C.) for 4.4 minutes, and then cooled to ambient temperature. The Hunter L color of the peanuts after roasting is approximately 36.4. The cooled peanuts are color sorted, ground into a paste, and fed into a kettle heated to 145° F. (63° C.). Next the hardstock, emulsifier, molasses, and peanut oil are melted together in a steam bath, and then added to the peanut paste and mixed for 5 minutes. The sugar and salt are then added, and mixed for an additional 15 minutes.

The hot peanut butter is homogenized at 3000 psi and then dearated under vacuum to remove oxygen and prevent oil separation. The dearated peanut butter is chilled in two brine-cooled scraped surface heat exchangers to achieve a final temperature of 86° F. (30° C.). The chilled peanut butter is then agitated in two pickers operating at nominally 50 rpm before packing in to 12 ounce plastic jars. The product is then tempered at 80° F. (27° C.) for 40 hours before evaluation. The peanut butter contains at least 1% by weight peanut skins. The peanut butter is not bland or bitter and does not have a speckled appearance.

Example II

Raw white-skinned Sun Runner-type peanuts obtained from the University of Florida (same as in Example I) are placed in metal screens and roasted at 410° F. at about 750 rpms and then cooled.

Two samples are then prepared. To prepare Sample A, about 200 grams of unblanched white-skinned peanuts are ground in a Cuisnart for about 5 minutes. The level of skins in Sample A is calculated at 2.1%. To prepare Sample B, about 200 grams of white-skinned peanuts are hand-blanched and ground for about 5 minutes.

Samples A and B are analyzed by expert flavorists. It is discovered that the roasted skins of the white-skinned peanuts have no flavor. There are no conclusive flavor differences between the blanched and unblanched pastes. The unblanched paste has a slightly higher speck count, but it is not readily noticeable. The blanched paste is somewhat smoother, potentially due to higher free oil content or smoother grind.

What is claimed:

1. A peanut butter or peanut spread which is not bitter or bland and which does not have a speckled appearance, wherein at least about 75% of the peanuts used to prepare the peanut butter are unblanched white-skinned peanuts and wherein at least about 1% by weight of the peanut butter comprises peanut skins.

2. A peanut butter or peanut spread according to claim 1 comprising from about 30% to about 60% by weight liquid peanut oil and from about 40% to about 70% by weight peanut particles.

3. A peanut butter or peanut spread according to claim 2 comprising:
    (a) from about 30% to about 60% by weight liquid peanut oil;
    (b) from about 40% to about 70% by weight peanut particles;
    (c) from about 1% to about 5% by weight stabilizer;
    (d) from about 0.5% to about 1.5% by weight emulsifier;
    (e) from about 1% to about 12% by weight sweetener; and
    (f) from about 1% to about 1.5% by weight salt.

4. A peanut butter or peanut spread according to claim 3 wherein at least about 90% of the peanuts used to prepare the peanut butter are unblanched white-skinned peanuts and wherein at least about 2.0% by weight of the peanut butter comprises peanut skins.

* * * * *